US005381925A

United States Patent [19]

Cervantes et al.

[11] Patent Number: 5,381,925

[45] Date of Patent: Jan. 17, 1995

[54] STIRRER/STRAW DISPENSER

[76] Inventors: Pat Cervantes, Rte. 2, Box 687, San Antonio, Tex. 78249; Moses Cervantes, 8010 Pebble Dr., New Orleans, La. 70128

[21] Appl. No.: 141,049

[22] Filed: Oct. 26, 1993

Related U.S. Application Data

[63] Continuation-in-part of Ser. No. 94,897, Jul. 22, 1993, Pat. No. 5,318,196.

[51] Int. Cl.[6] .............................................. B65G 59/06

[52] U.S. Cl. .................................... 221/184; 221/202; 221/256; 221/263; 221/268; 221/274; 221/276

[58] Field of Search ............... 221/183, 184, 187, 191, 221/194, 195, 196, 200, 202, 203, 239, 255, 256, 263, 268, 270, 272, 274, 276

[56] References Cited

U.S. PATENT DOCUMENTS

| | | | |
|---|---|---|---|
| 647,955 | 4/1900 | Fonsskov | 221/274 X |
| 896,390 | 8/1908 | Joyce . | |
| 1,088,912 | 3/1914 | Long | 221/256 |
| 1,102,377 | 7/1914 | Wilton | 221/203 |
| 1,247,225 | 11/1917 | Cloovas . | |
| 1,844,482 | 2/1932 | Schick . | |
| 2,078,490 | 4/1937 | Fritsche et al. | 221/195 X |
| 2,467,799 | 4/1949 | Archer | 312/67 |
| 2,566,808 | 9/1951 | Petty | 221/187 |
| 3,667,650 | 6/1972 | Noda et al. | 221/250 |

FOREIGN PATENT DOCUMENTS

| | | | |
|---|---|---|---|
| 326995 | 3/1930 | United Kingdom | 221/256 X |

*Primary Examiner*—Robert P. Olszewski
*Assistant Examiner*—Dean A. Reichard
*Attorney, Agent, or Firm*—Jacobson, Price, Holman & Stern

[57] ABSTRACT

A dispenser for containing and dispensing elongated articles such as coffee stirrers, straws and the like is provided and presents an inclined wall therein including upper and lower end portions against and downwardly along which articles to be dispensed rest and may move by gravity. A dispensing member equipped with an upwardly opening groove is reciprocal transversely of the lower end portion of the inclined wall and includes an upper surface along which articles to be dispensed may move from the aforementioned lower end portion into the groove. The dispenser includes a side wall having an opening therein with which one end of the groove is registered and the opposite end of the groove is closed, whereby an article disposed in the groove may be dispensed through the opening upon movement of the dispensing member toward the one side wall of the dispenser. An operating knob is provided to effect oscillation of the dispensing member and structure is provided to agitate the articles to be dispensed as they move from the lower end of the inclined wall toward the groove responsive to operation of the operating knob.

5 Claims, 2 Drawing Sheets

STIRRER/STRAW DISPENSER

CROSS REFERENCE TO RELATED APPLICATIONS

This application comprises a continuation-in-part of application Ser. No. 08/094,897, for coffee stirrer dispenser, filed Jul. 22, 1993, now U.S. Pat. No. 5,318,196.

BACKGROUND OF THE INVENTION

1. Field of the Invention

This invention relates to an apparatus for containing and individually dispensing a plurality of elongated members such as coffee stirrers, straws and the like.

2. Description of Related Art

Various different forms of article dispensing assemblies including some of the general structural and operational features of the instant invention heretofore have been provided. Examples of these previously known forms of dispensing apparatuses are disclosed in U.S. Pat. Nos. 896,390, 1,247,225, 1,844,482, 2,467,799 and 3,667,650. However, these previously known forms of dispensing apparatuses do not include the overall combination of structural and operational features included in the instant invention. The coffee stirrer dispenser disclosed in our copending U.S. application Ser. No. 08/094,879 referred to above is quite similar in many respects to the instant invention, but the dispenser disclosed and claimed herein has been improved in order to provide smoother operation.

SUMMARY OF THE INVENTION

The dispenser of the instant invention incorporates a housing defining an internal hopper portion for receiving therein a plurality of elongated articles in parallel relation. The hopper portion includes a downwardly inclined wall against which and downwardly along which the articles rest and move by gravity toward a lower end portion of the inclined wall with which the upper surface of a transversely shiftable dispensing block is registered and the block includes an upwardly opening groove therein into which the next article to be dispensed may fall by gravity. The housing includes a first side wall toward and away from which the dispensing block is movable and the first wall includes a dispensing opening therein registered with the adjacent end of the aforementioned groove, the remote end of the groove being closed.

The forward side of the housing includes a closure wall through which an oscillatable shaft is rotatably received and the dispensing block includes an opening therethrough eccentrically located relative to the aforementioned shaft through which an eccentric pin is received, the pin being eccentrically mounted on a knob relative to the aforementioned shaft from which the knob is supported. In addition, the rear side of the dispensing block remote from the forward side of the housing is recessed and the recess receives therein an upstanding plate oscillatably supported adjacent its lower end and including a vertical slot therein through which the eccentric pin also is received, whereby the upstanding plate may be oscillated back and forth about its lower pivot axis responsive to oscillation of the knob.

The upper end of the upstanding plate projects slightly above the upper surface of the transversely shiftable dispensing block when the plate is disposed in a fully upright position for slightly engaging, upwardly displacing and agitating elongated articles resting upon the aforementioned upper surface immediately before falling into the upwardly opening groove of the block to thereby ensure that elongated articles to be dispensed and urged by gravity downwardly toward the dispensing block do not jam up at the block and are urged, by agitation, to fall into the upwardly opening dispensing block groove.

The main object of this invention is to provide a dispenser for elongated articles such as coffee stirrers, straws and the like and with the dispenser constructed in a manner such that it may contain a large quantity of elongated articles to be singly dispensed therefrom and also in a manner such that single dispensing of the elongated articles may be readily carried out without malfunction of the dispenser.

Another object of this invention is to provide an elongated article dispenser in accordance with the preceding object and which includes a minimum of moving parts and incorporates an operator therefore of simple construction and which may be readily operated by substantially anyone, even those persons having never before seen the dispenser.

Another very important object of this invention is to provide an elongated article dispenser which may be readily modified to dispense various different forms of elongated articles.

A further object of this invention is to provide an elongated article dispenser whose external shape may be varied for aesthetic purposes and use in different environments.

Yet another object of this invention is to provide an article dispenser whose dispensing operation is smooth and dependable.

A final object of this invention to be specifically enumerated herein is to provide an elongated article dispenser in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
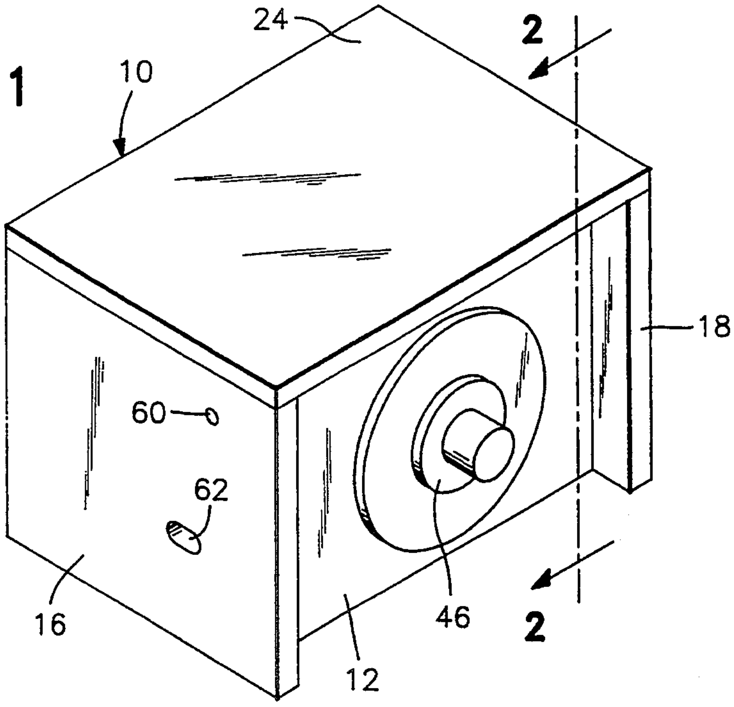
FIG. 1 is a perspective view of an article dispenser constructed in accordance with the present invention.
Figure 2:
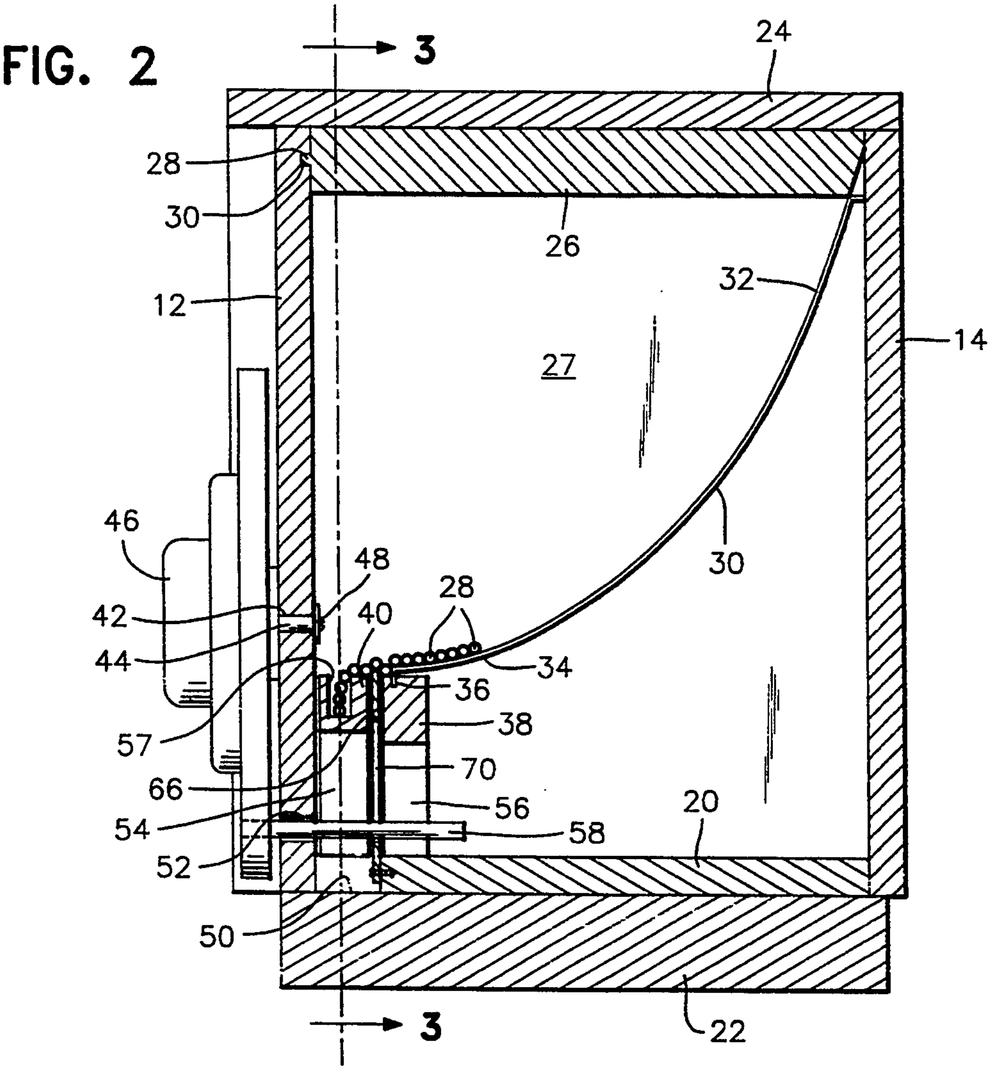
FIG. 2 is an enlarged vertical sectional view of the article dispenser taken substantially upon the plane indicated by the section line 2—2 of FIG. 1.

Referring now more specifically to the drawings the numeral 10 generally designates the dispenser of the instant invention which is illustrated in the form of a rectangular housing, but which may take any ornamental shape, if desired.

The housing 10 includes front and rear walls 12 and 14 interconnected by first and second side walls 16 and 18 and the lower ends of the walls 12, 14, 16 and 18 are interconnected by a bottom wall 20 whose peripheral edges are secured to the lower margins of the walls 14, 16 and 18. In addition, the dispenser or housing 10 includes a base 22 disposed beneath the bottom wall 20 with the lower edges of the walls 12, 14, 16 and 18 downwardly abutting against the base 22.

The top of the housing is closed by a top wall 24 which includes a downward projection 26 downwardly receivable within the upper confines of the walls 12, 14, 16 and 18 and including a central forward projection 28 removably receivable in a rearwardly opening recess 30 formed in the upper margin of the front wall 12, the forward marginal edges of the walls 16, 18 and 24 projecting forwardly of the front face of the front wall 12.

The interior of the housing defines an internal hopper portion 27 for receiving therein a plurality of elongated members 28 such as coffee stirrers, straws or the like. The hopper portion 27 is defined by an inclined (arcuate) wall 30 having its upper marginal edge 32 anchored to the rear wall 14 in any convenient manner and extending fully between the opposite side walls 16 and 18. The lower end or marginal portion 34 of the inclined wall 30 is anchored within a groove 36 provided therefor in an anchor block 38 supported from the bottom wall and extending thereacross between the side walls 16 and 18. The anchor block 38 is spaced rearward of the front wall 12 and a dispensing block 40 is disposed between the anchor block 38 and the front wall 12 for oscillation toward and away from the side walls 16 and 18.

The front wall 12 has a horizontal front to rear extending bore 42 formed therethrough in which an axle or shaft 44 is rotatably journaled, the forward end of the shaft 44 carrying an oscillatable actuating knob 46 on its forward end forward of the front wall 12, the shaft 44 being secured through the front wall 12 through the utilization of a fastener assembly 48.

The central portion of the forward marginal edge of the bottom wall 20 is provided with a forwardly opening notch 50, the front wall 12 includes an upwardly concave arcuate slot 52 formed therein below the bore 42, the dispensing block 40 includes a narrow downwardly opening notch 54 formed in its central portion and the anchor block 38 includes a wide downwardly opening notch 56 formed therein.

The lower outer peripheral portion of the knob 46 includes a rearwardly projecting pin 58 which extends through the slot 52 as well as the notches 54 and 56. The opposite ends of the slot 52 adjacent the walls 16 and 18 and the opposite ends of the notch 56 adjacent the walls 16 and 18 comprise limits of oscillation of the pin 58 and the narrow notch 54 is only slightly wider than the diameter of the pin 58 such that oscillation of the knob 46 will cause oscillation of the dispensing block 40 back and forth toward and away from the side walls 16 and 18, the dispensing block 40 defining an upwardly opening dispensing groove 57 formed thereon opening upwardly through the upper surface of the dispensing block 40. The upper surface of the dispensing block 40 is substantially horizontally aligned with the upper surface of the anchor block 38 and the lower end of the inclined wall 30 is only slightly elevated above the upper surface of the abutment block 38.

The front wall is received in vertically extending inwardly opening grooves (not shown) formed in the forward marginal portions of the walls 16 and 18 and is secured in position between the walls 16 and 18 through the utilization of fastener means 60 secured inwardly through the walls 16 and 18 and into the opposing margins of the front wall 12. In addition, the side wall 16 includes a dispensing opening 62 formed therein in registry with the left hand end of the groove 57, the right hand end of the groove 57 being closed as at 64.

The lower end of an elongated, upstanding agitator plate 66 is pivotally mounted within the notch 50 through the utilization of a suitable pivot fastener 68 and the agitator plate 66 includes an elongated, longitudinally extending opening 70 formed therein somewhat greater in width than the diameter of the pin 58. The agitator plate 66 is received within a rearwardly opening recess 72 formed in the central portion of the dispensing block 40 where upon the agitator plate 66 is captive between the forward extremity of the recess 72 and the front side of the anchor block 38. The pin 58 extends through the opening 70 and, upon back and forth oscillation of the pin 58 through the arcuate slot 52, the agitator plate 66 swings back and forth from the extreme right hand position thereof illustrated in FIG. 4, past the upright position illustrated in FIG. 3 and to an extreme right hand position opposite to that illustrated in FIG. 4. Thus, the pin 58 not only causes oscillation of the agitator plate 66 during oscillation of the knob 46 but also back and forth rectilinear shifting of the dispenser block 40.

Figure 3:
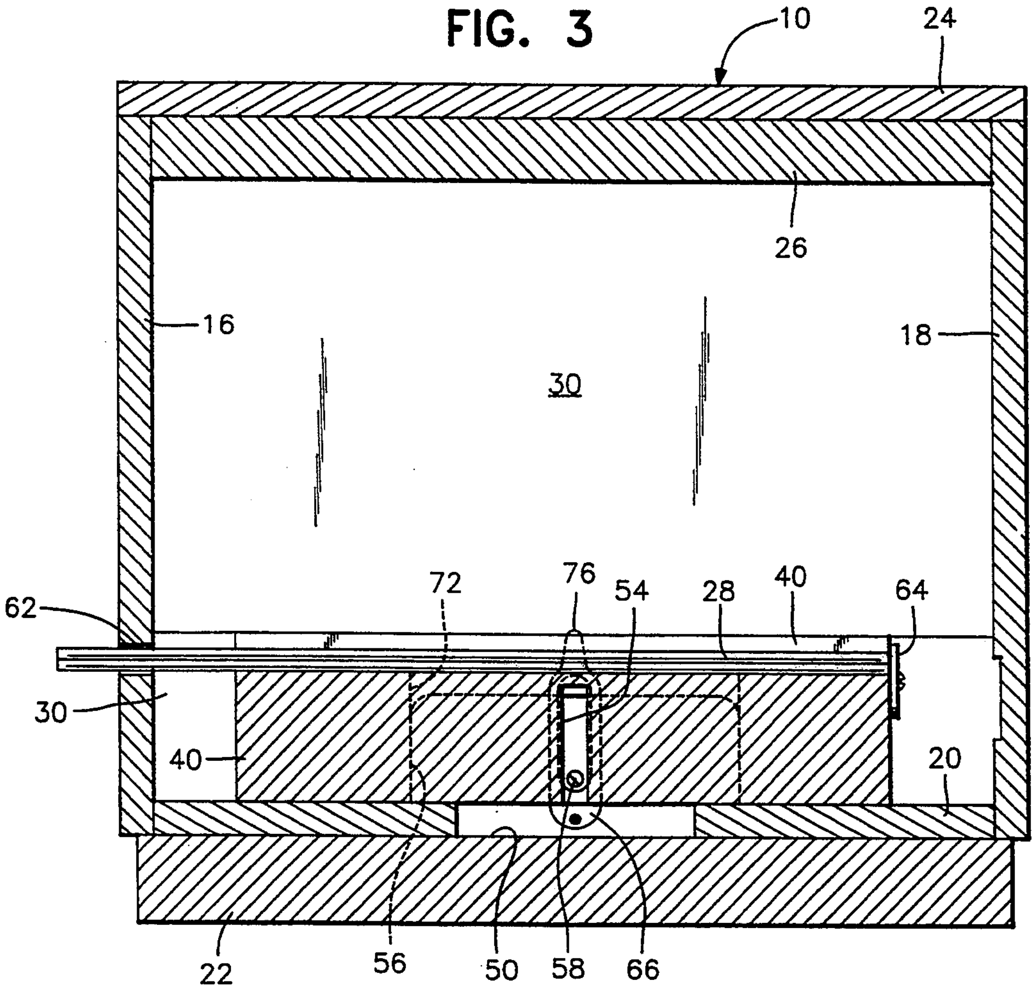
FIG. 3 is a vertical sectional view taken substantially upon the plane indicated by the section line 3—3 of FIG. 2.

With attention now invited more specifically to FIG. 3, it may be seen that the upper extremity 76 of the agitator plate 66 projects upwardly above the upper surface of the blocks 38 and 40 and therefore upwardly displaces the midportion of an elongated member registered with the upper end of the recess 72 in order to agitate the elongated member and to ensure that elongated members disposed forward thereof move properly into position for falling into the groove 57.

Figure 4:
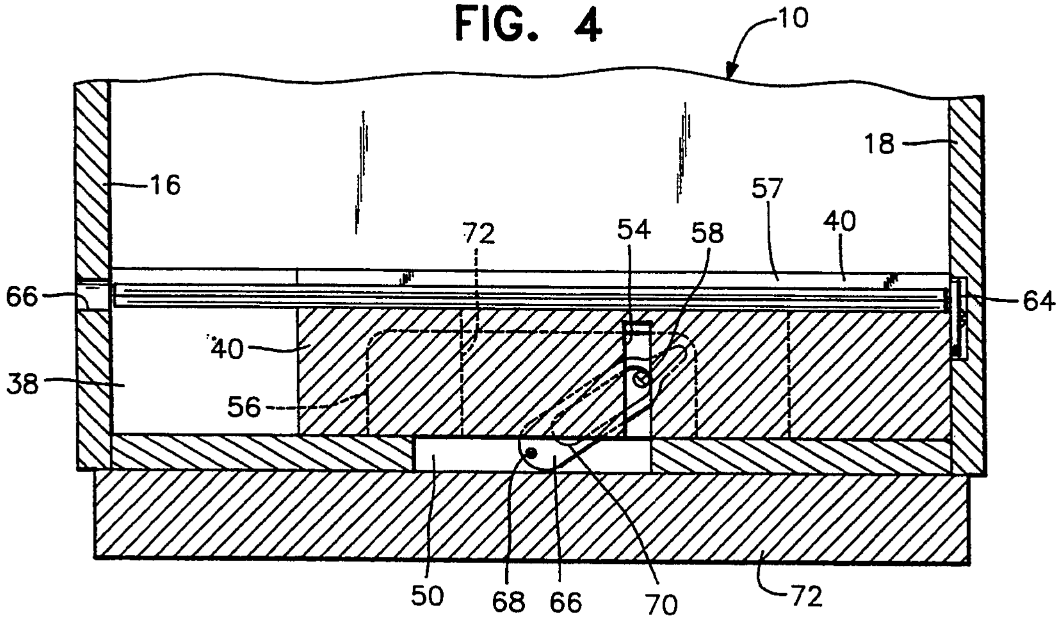
FIG. 4 is an enlarged vertical sectional view similar to the lower portion of FIG. 3, but with the dispensing block and other shiftable dispensing components in corresponding alternate positions.

When the dispensing block 40 is displaced fully to the right as viewed in FIG. 4 of the drawings, an elongated member 28 registered with the upper end of the groove 57 is free to fall downwardly thereinto and when the dispensing block 40 is next displaced to the right at least to the position thereof illustrated in FIG. 3, the elongated member 28 seated within the groove 57 is displaced outwardly of the dispensing opening 62. In this manner, the extended end of the dispensed elongated member 28 may be manually gripped and pulled from the left side of the dispenser or housing 10. Thereafter, the dispensing block 40 may again be returned to the rightmost limit position illustrated in FIG. 4 in readiness to receive the next elongated member 28 to be dispensed.

If it is desired, spring means (not shown) may be operably connected between the knob and the front wall 12 in order to ensure angular displacement of the knob 46 to return the latter to a position in which the dispensing block 40 is shifted toward its rightmost limit position illustrated in FIG. 4 after an elongated member has been dispensed from the housing 10. Further, a compression spring such as that disclosed in copending application Ser. No. 08/094,897 may be operably connected between the side wall 16 and the dispensing block 40 for accomplishing the same purpose. However, it has been found that a simple double ended arcuate arrow may be placed on the upper peripheral portion of the outer face of the knob 46 to indicate to users of the dispenser 10 the manner in which the knob 46 is to be oscillated in order to dispense a coffee stirrer, straw or the like.

The foregoing is considered as illustrative only of the principles of the invention. Further, since numerous modifications and changes readily will occur to those skilled in the art, it is not desired to limit the invention to the exact construction and operation shown and described, and accordingly, all suitable modifications and equivalents may be resorted to, falling within the scope of the invention.

What is claimed as new is as follows:

1. A dispenser for elongated articles, said dispenser including a housing defining an internal hopper portion for receiving therein a plurality of said articles in parallel relation, said hopper including an inclined wall against and downwardly along which said articles rest and move by gravity, said housing including opposite side walls, one of said side walls having a dispensing opening formed therein, a dispensing block having an upper surface and mounted in said housing and movable toward and away from said one wall and including an upwardly opening groove for receiving one of said articles therein, the end of said groove remote from said one side wall being closed, said block being operative, when having an article received in said groove and moved toward said one wall, to partially lengthwise dispense said article through said dispensing opening, said inclined wall having a lower end portion, said groove being generally horizontally registered with said lower end portion of said incline wall, said housing including a front wall closing a front of said housing between said side walls and having a bore formed therethrough, a shaft oscillatably secured through said bore and mounting a knob thereon forward of said front wall, said front wall including a slot formed therethrough below said bore, the lower periphery of said knob including a rearwardly projecting pin supported therefrom slidably received through said slot, said dispensing block including a narrow downwardly opening notch formed therein in which said pin, rearwardly of said front wall, is slidably received, whereby oscillation of said knob relative to said front wall will cause rectilinear oscillation of said dispensing block within said housing.

2. The dispenser of claim 1 including an anchor block mounted in said housing rearward of said dispensing block, an upstanding agitator plate pivotally mounted at its lower end within said housing between said blocks and including a vertically elongated opening therein, said pin also being received through said opening for oscillation of said agitator plate responsive to oscillation of said knob, the upper end of said agitator plate, when the latter is vertically disposed, projecting slightly above the upper surface of said dispensing block and being operative to upwardly displace and thus agitate an elongated member registered therewith preparatory to further forward movement for falling into said groove.

3. The dispenser of claim 2 wherein the lower end portion of said inclined wall is supported from said anchor block.

4. The dispenser of claim 3 wherein one of said dispensing and anchor blocks has an upstanding recess formed therein opening toward the other block, said agitator plate being received in said recess for oscillation therein.

5. The combination of claim 4 wherein said recess is formed in said dispensing block.

* * * * *